Henri-Georges Doll
Jean L. Dumanoir
INVENTORS

BY Richard E. Bee
ATTORNEY

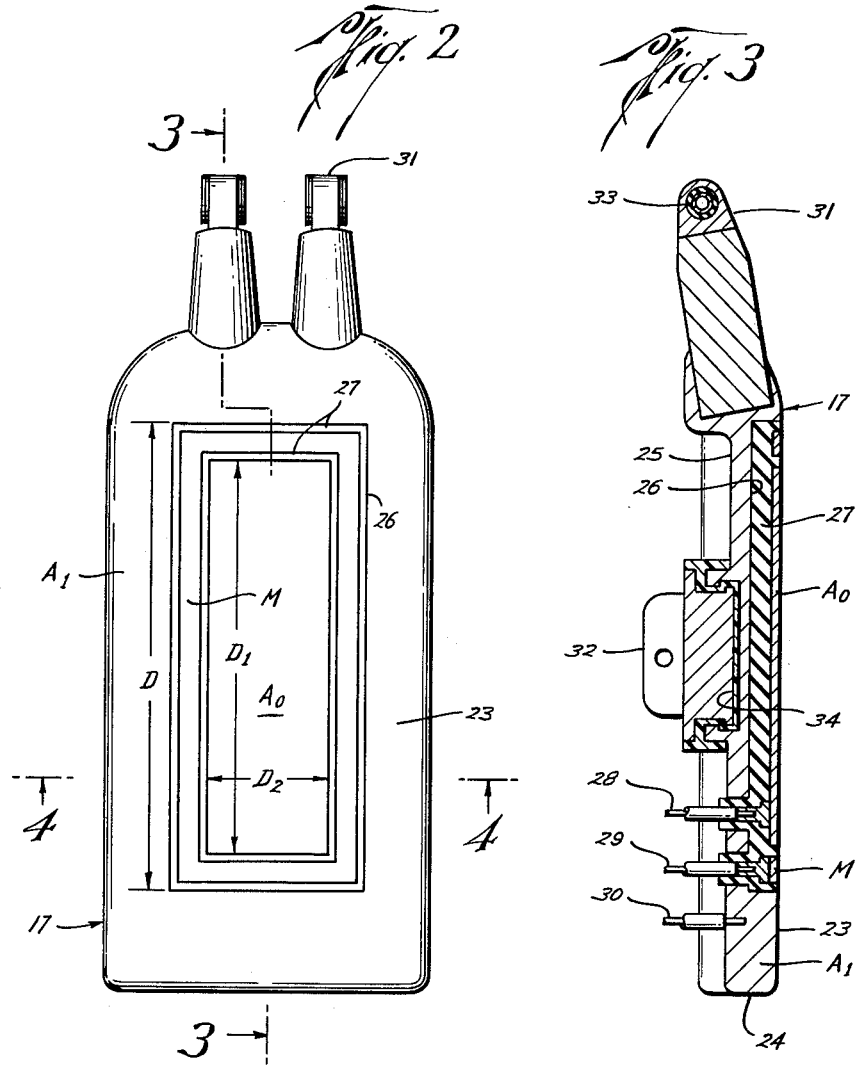

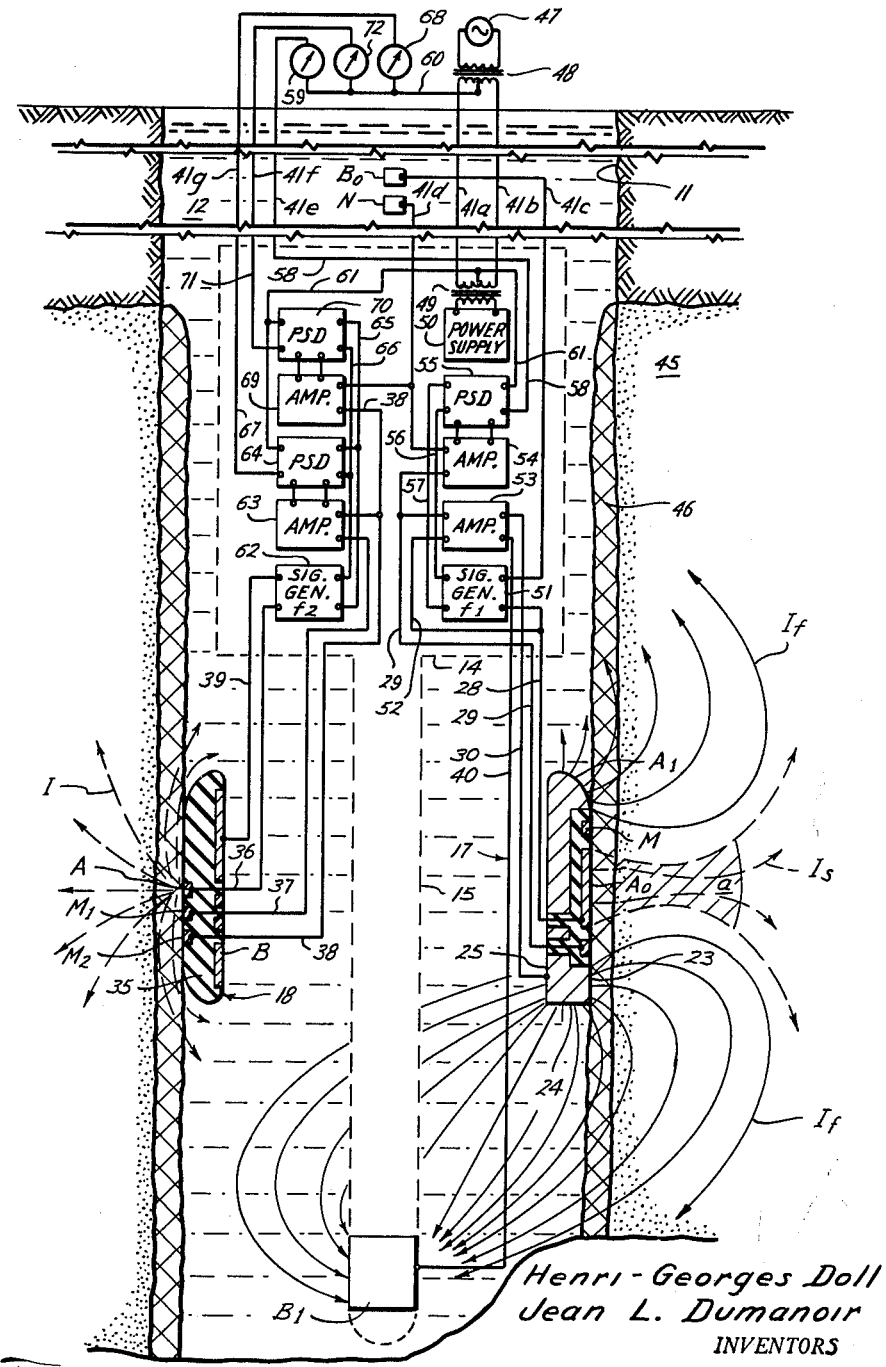

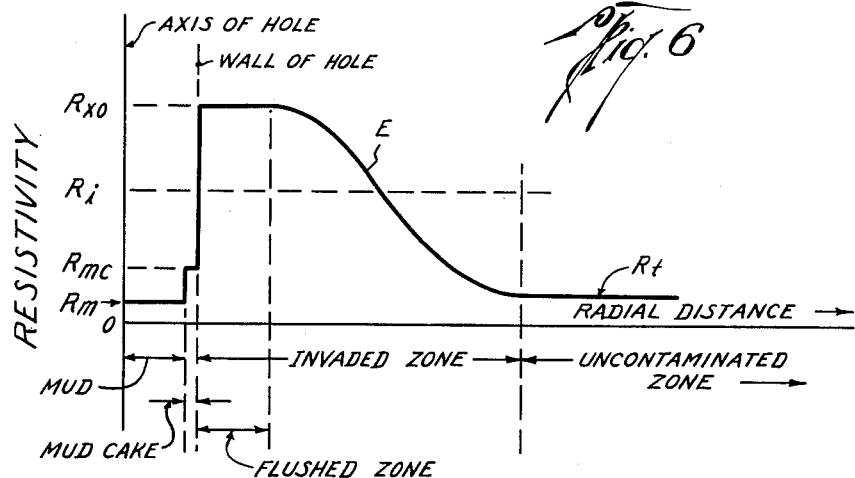
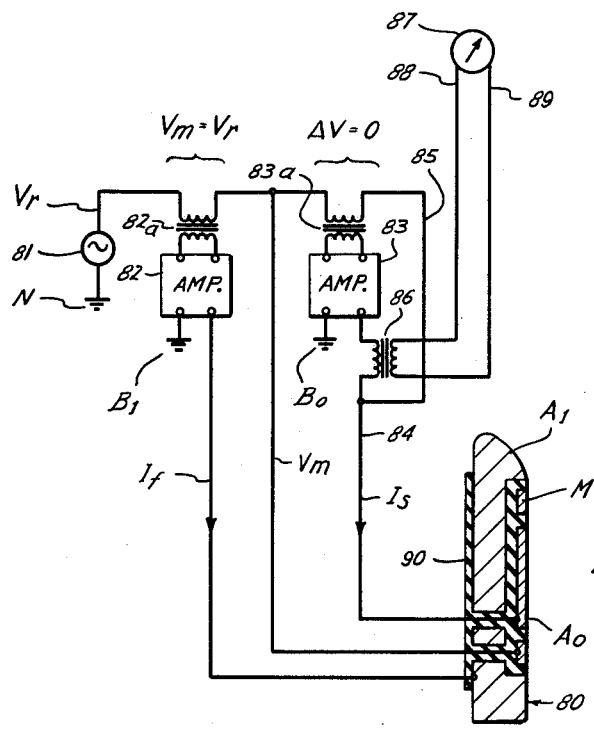

United States Patent Office 3,132,298
Patented May 5, 1964

3,132,298
METHODS AND APPARATUS FOR INVESTIGATING EARTH BOREHOLES BY MEANS OF ELECTRODES CONSTRUCTED TO CONTACT THE BOREHOLE WALLS
Henri-Georges Doll and Jean L. Dumanoir, Ridgefield, Conn., assignors to Schlumberger Well Surveying Corporation, Houston, Tex., a corporation of Texas
Filed June 16, 1959, Ser. No. 820,820
39 Claims. (Cl. 324—10)

This invention relates to electrical methods and apparatus for investigating subsurface earth formations traversed by a borehole and, particularly, to such methods and apparatus of the type wherein measurements of the electrical resistance properties of subsurface earth formations are made by moving a system of electrodes through a borehole.

It has become common practice to obtain records or logs of the resistivity or conductivity values of the earth formations adjacent a borehole drilled into the earth by moving a system of electrodes through the borehole and determining the resistance presented by the earth formations to the flow of electrical current emitted from one or more of the electrodes. An electrical log obtained in this manner aids in determining the nature and lithological character of the various subsurface formations. This information is particularly useful in the case of oil well boreholes in that it enables the presence and depth of any oil or gas-bearing strata to be determined.

In obtaining these electrical logs of subsurface formations, an important consideration is the fact that the subsurface formations at the time of making the electrical measurements are no longer in their original undisturbed condition. The drilling mud contained in the borehole, for example, usually will have penetrated laterally into the various permeable strata for a distance which depends on the porosity of such strata. This invasion of drilling mud into a permeable strata or zone causes the solid particles suspended in the drilling mud to build up in the form of a mud cake on the wall of the borehole in front of such permeable zone. The fluid residue, that is, the mud filtrate which actually invades the permeable zone alters the electrical resistance properties of the earth formation portions immediately adjacent the borehole and, in the majority of cases, increases the resistivity of such portions. The resistivity of this invaded zone is usually highest over the portion of the formation closest to the borehole wall because the low resistivity connate formation fluids are more completely flushed from this portion and replaced by the higher resistivity mud filtrate. The resistivity of the mud cake itself which is formed on the borehole wall on the other hand, is relatively low compared to the resistivity of this flushed zone.

Advantage may be taken of the existence of the mud cake and the flushed zone both to indicate the presence of permeable strata and to provide a measure of the porosity thereof. This is important because most producible oil-bearing formations are relatively permeable in nature. Measurements of such properties are commonly made by using a wall contact type of electrode system of the kind described in Patent No. 2,669,688 granted to H. G. Doll on February 16, 1954. This type of electrode system utilizes an array of relatively small electrodes affixed to the wall-engaging face of an insulating wall contact pad for measuring the average resistivity or conductivity of small volumes of material located directly in front of the pad.

A problem is sometimes encountered with this wall contact type of apparatus in that as the mud cake thickness increases, more and more of the electrode current is shunted or short circuited back to the borehole by the relatively low resistance path formed by such mud cake. This renders a measurement of the flushed zone resistivity and, hence, the subsequent porosity determination more difficult because the measurement is influenced to a larger extent by the mud cake resistivity.

To overcome this problem, it has been proposed to use a so-called "focussed" type of wall contact electrode system of the kind described in Patent No. 2,712,629, granted to H. G. Doll on July 5, 1955. In a focussed system of this type, a principal current flow used for determining or surveying the formation resistance characteristics is constrained to a desired lateral flow pattern by emitting focussing current adjacent thereto for opposing any tendency of the survey current to flow in an undesired direction and, in particular, for opposing any tendency of the survey current to flow along the mud cake. In this manner, the survey current is caused to penetrate laterally into the earth formations for an appreciable distance into the invaded zone. For minimum to moderate thicknesses of mud cake, this focussed type of apparatus provides accurate measurements of the resistivity or conductivity of the flushed portion of the invaded zone. For relatively thick mud cakes, however, it has been found that this form of electrode system also becomes adversely affected by the mud cake.

In other cases, the existence of a mud cake and an invaded zone makes it more difficult to obtain other types of desired electrical measurements. In particular, it is frequently desirable to also obtain a measure of the resistivity or conductivity of the uncontaminated portions of the formations lying beyond the invaded zone. This is often difficult to do with a high degree of precision, however, because the presence of the invaded zone renders it more difficult to get the current to flow into the uncontaminated portion of the formation in a desired manner. This problem can be overcome to a large degree by using deep penetration focused electrode systems of the type described in Patent Nos. 2,712,627 and 2,712,628, both granted to H. G. Doll on July 5, 1955. These electrode systems utilize relatively large sized electrode arrays which are suspended in the borehole and which emit suitable focussing currents for driving the survey current relatively deeply in a lateral sense into the adjacent formation.

While these types of deep penetration focussed electrode systems provide an improved measure of the uncontaminated formation resistivity or conductivity, it has nevertheless been found that the resistivity of the invaded zone still continues to contribute to the average resistivity or conductivity measured by such an electrode system, the amount of contribution depending upon the particular formation conditions encountered. Accordingly, it would, in many cases, be desirable to adjust the measurement obtained with a deep penetration type of electrode system in accordance with the value of the invaded zone resistivity to obtain a more accurate indication of the uncontaminated formation resistivity. In other words, it would be desirable to have an accurate measurement of the resistivity or conductivity of the invaded zone by itself. In this regard, the invaded zone measurements could also be used together with the data obtained with a deep investigation coil-type induction logging device, which data is representative of essentially only the resistivity of the uncontaminated portion of the formations to provide a more complete picture of borehole conditions.

It is an object of the invention, therefore, to provide new and improved methods and apparatus for measuring the electrical resistance properties of earth formations adjacent a borehole.

It is another object of the invention to provide new and improved electrical logging apparatus which provides a better and more direct measure of the resistivity or conductivity of the flushed portion of the invaded zone.

It is a further object of the invention to provide new and improved electrical logging apparatus which is also capable of providing a better measure of the average resistivity or average conductivity of the invaded zone as a whole.

It is an additional object of the invention to provide new and improved electrical logging apparatus of the focussed type which provides improved focussing action under adverse borehole conditions.

It is yet another object of the invention to provide a highly focussed type of electrical logging apparatus which, at the same time, has a relatively shallow depth of lateral penetration.

It is a still further object of the invention to provide a new and improved wall contact type of electrode system which is less affected by the presence of mud cake on the borehole wall.

It is an additional object of the invention to provide a new and improved wall contact type of electrode system having a more rugged form of construction and which is less sensitive to variations in the degree of contact with the borehole wall.

In accordance with one feature of the invention, a method of investigating earth formations traversed by a borehole comprises emitting current at a first point in a borehole and emitting current at a second point in the borehole located a predetermined distance from the first point, one of these currents being a survey current and the other being a focussing current. An indication is then obtained of the potential difference between one of these current-emission points and a potential measuring point spaced at less than the predetermined distance therefrom. In a typical embodiment, the potential measuring point is located intermediate the current-emission points. One of the survey and focussing currents is then adjusted until this potential difference becomes substantially zero. When this condition prevails, there is then obtained an indication representative of the flow of at least one of the currents for providing a measure of the formation resistivity. In a typical embodiment, this indication is obtained by determining the potential level of the potential measuring point with respect to an electrically-remote reference point.

In accordance with another feature of the invention, apparatus for investigating earth formations traversed by a borehole comprises an electrode array adapted for movement through the borehole and including first and second current-emitting electrodes and an intermediate potential monitor electrode. The apparatus also includes circuit means for energizing the first current-emitting electrode for emitting current therefrom into adjacent earth formations. The apparatus further includes circuit means for providing an indication of the potential difference between the monitor electrode and one of the current emitting electrodes. The apparatus also includes circuit means for energizing the second current-emitting electrode and for adjusting the current emitted therefrom until the mentioned potential difference becomes substantially zero. In addition, the apparatus includes means responsive to the flow of at least one of the currents for providing an indication representative of the formation resistivity.

In accordance with a further feature of the invention, electrode apparatus for investigating earth formations traversed by a borehole comprises a pad member adapted to be urged against the borehole wall. This pad member includes a first electrode forming part thereof and having a surface portion located on the wall-engaging face thereof for emitting survey current into the adjacent earth formation. The apparatus also includes a second electrode forming part of the pad member and having surface portions located on the wall-engaging face thereof defining a path encircling the first electrode surface portion for measuring the potential level adjacent the first electrode. The apparatus further includes a third electrode forming part of the pad member and having surface portions located on the wall-engaging face and the edge thereof defining a region encircling the second electrode surface portions for emitting focussing current both into the adjacent earth formation and directly into the drilling fluid contained in the borehole.

For a better understanding of the present invention, together with other and further objects thereof, reference is had to the following description taken in connection with the accompanying drawings, the scope of the invention being pointed out in the appended claims.

Referring to the drawings:

FIG. 2 is an enlarged elevational view of the wall-engaging face of one of the electrode pads of the FIG. 1 apparatus;

FIG. 3 is a cross-sectional view of the electrode pad of FIG. 2 taken along the section line 3—3 thereof;

FIG. 4 is a further cross-sectional view of the electrode pad of FIG. 2 taken along the section line 4—4 thereof;

FIG. 5 is a cross-sectional view of a typical borehole including, in schematic form, portions of the FIG. 1 apparatus together with suitable electrical circuits for operating such apparatus;

FIG. 6 is a graph illustrating a typical manner in which the resistivity values may vary in a horizontal direction relative to the borehole axis; and FIG. 7 illustrates in a schematic manner a modified form of electrical circuits which may be used with a portion of the FIG. 1 apparatus.

Figure 1:
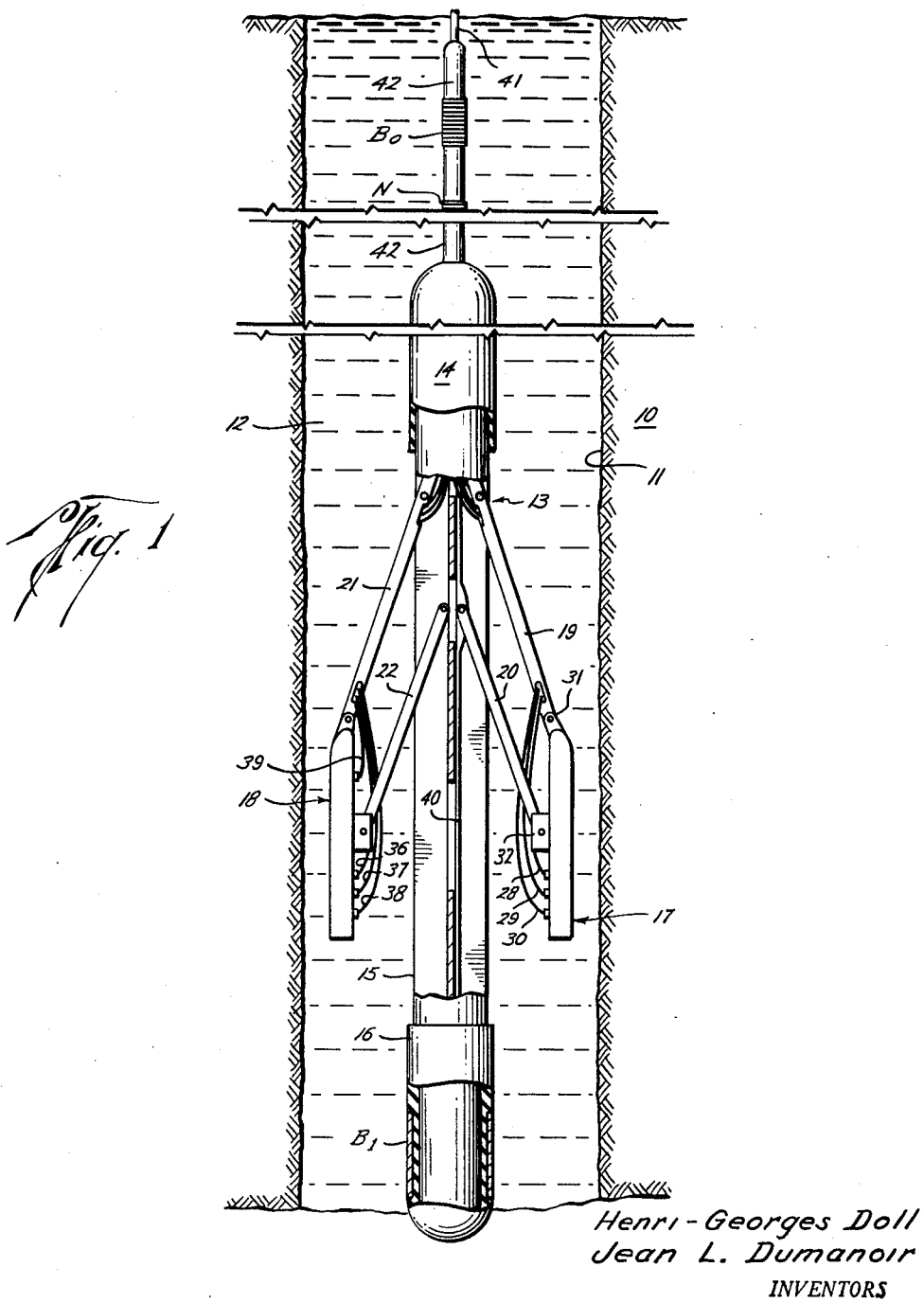
FIG. 1 illustrates partly in cross section a representative embodiment of borehole investigating apparatus constructed in accordance with the present invention.

Referring to FIG. 1 of the drawings, there is shown a representative embodiment of the downhole portion of apparatus constructed in accordance with the present invention for investigating earth formations 10 traversed by a borehole 11, the borehole 11 being filled with a conductive fluid or drilling mud 12. This apparatus includes an elongated support member 13 adapted for movement through the borehole 11. The support member 13 includes an upper instrument housing portion 14 of generally cylindrical shape and having a hollow and fluid-tight interior for enclosing certain downhole electrical circuits to be discussed hereinafter. The support member 13 also includes an intermediate frame portion 15 in the form of an iron or steel I-beam and a lower nose portion 16 of generally cylindrical shape.

Supported from the intermediate I-beam portion 15 of the support member 13 on opposite sides thereof are a pair of electrode pad members 17 and 18, each of which is adapted to be urged against the wall of the borehole 11. The pad member 17 is supported by way of support arms 19 and 20 which are pivoted to both the pad member 17 and the I-beam portion 15. Similarly, the pad member 18 is supported by way of support arms 21 and 22 which are pivoted to both the pad member 18 and the I-beam portion 15. A suitable actuating mechanism for extending and retracting the support arms 19 and 21 is included within the lower portion of the instrument housing section 14.

Considering first the electrode pad member 17, this pad member 17 incorporates novel features of the present invention in the construction thereof and, accordingly, is shown in greater detail in FIGS. 2–4, inclusive. Referring then to FIGS. 2–4, it is seen that the major portion of the pad member 17 is formed by a generally rectangular pad portion $A_1$ of solid metal construction. This $A_1$ portion is made of an electrically conductive material such as iron and, as such, constitutes a focussing current electrode for emitting focussing current from the various surface portions thereof. This focussing current electrode $A_1$ thus includes a surface portion 23 located on the wall-engaging face thereof, a surface portion 24 located on and forming the edge thereof and a surface portion 25 forming at least part of the backside thereof. As seen in FIG. 3, the $A_1$ electrode has a recess 26 cut into a central portion of the wall-engaging face thereof. As seen in FIG. 2, this recess 26 is of rectangular shape elongated in a direction "D" running parallel to the longitudinal axis of the borehole. The recess 26 is substantially filled with a suitable electrical insulation material 27 such as rubber.

The metal pad member 17 also includes an elongated electrode $A_0$ of rectangular shape located in the recess 26 and electrically insulated from the $A_1$ electrode proper by the insulation material 27. The surface portion of this $A_0$ electrode is thus centrally located relative to the wall-engaging face portion 23 of the $A_1$ electrode. The $A_0$ electrode has a length $D_1$ in a direction parallel to the borehole axis which is greater than one-half the length of the metal pad electrode $A_1$ and a width $D_2$ greater than one-quarter of the length $D_1$. For the case of a borehole having a diameter of eight inches, dimensions $D_1$ and $D_2$ may be, for example, six inches and two inches, respectively. In this manner, it is seen that this $A_0$ electrode is provided with a relatively large exposed surface area. This exposed surface portion constitutes a survey current electrode surface for emitting survey current into the adjacent earth formations.

The metal pad member 17 further includes a potential monitor electrode M located intermediate the survey current electrode $A_0$ and the focussing current electrode $A_1$ and electrically insulated from both the survey current electrode $A_0$ and the focussing current electrode $A_1$ by the insulation material 27. This potential monitor electrode M has an exposed surface portion of narrow width which defines a path encircling the $A_0$ survey current electrode.

Electrical connections to the electrodes $A_0$, M and $A_1$ are made by way of insulated conductors 28, 29 and 30, respectively, which, as shown in FIG. 1, pass upwardly and through the hollow interior of the support arm 19 to the electrical circuits contained within the instrument housing portion 14. Mechanical connection of the metal pad member 17 to the support arms 19 and 20 is made by way of lug members 31 and 32, respectively, these lug members being shown in detail in FIG. 3. The electrical continuity of these lug members 31 and 32 is broken by means of inserts 33 and 34 of nonconductive material. Insert 33 is in the form of a nonconductive bushing of, for example, Bakelite. Insert 34, on the other hand, may be formed of an epoxy-aluminum oxide compound. These inserts 33 and 34 serve to electrically isolate the metal pad member 17 proper from the support arms 19 and 20.

Considering now the other electrode pad member shown in FIG. 1, namely, the electrode pad member 18, this pad member is of a known type of construction which is described in greater detail in the above-mentioned H. G. Doll Patent 2,669,688. A schematic representation of the cross section of this pad member 18 is indicated in FIG. 5 of the drawings. As shown in FIG. 5, the major portion of this pad member 18 is formed by a flexible pad or cushion member 35 of insulation material such as rubber. Relatively small button-type electrodes A, $M_1$ and $M_2$ are located on the wall-engaging face of the insulated pad 35. A metal plate member B embedded in the backside of the insulated pad 35 forms a current return electrode for this pad member. As shown in FIGS. 1 and 5, electrical connections to the electrodes A, $M_1$, $M_2$ and B are made by way of insulated conductors 36, 37, 38 and 39, respectively, which, as shown in FIG. 1, extend upwardly and through the hollow interior of the support arm 21 to suitable electrical circuits contained in the instrument housing portion 14.

As shown in FIG. 1, the downhole portion of the apparatus also includes a current return electrode $B_1$ located on the support member 13 close enough to the location of the pad member 17 so as to be electrically proximate thereto but longitudinally spaced apart from the location of the pad member 17 so that no portion of this $B_1$ electrode is located directly behind the pad member 17. This $B_1$ current return electrode is of generally cylindrical shape and is mounted on suitable electrical insulation material which either covers or forms the nose portion 16 of support member 13. Electrical connection to the $B_1$ electrode is made by way of an insulated conductor 40 which runs upwardly along the I-beam portion 15 to the instrument housing 14. If desired, a second $B_1$ current-return electrode may be mounted on the exterior of the instrument housing portion 14 a corresponding distance above the pad member 17. This second $B_1$ electrode would then be electrically connected to the lower $B_1$ electrode by way of a suitable conductor.

In addition to the nose portion 16, the instrument housing portion 14 is also either made of or else covered with a suitable electrical insulation material. The metal parts of the I-beam portion 15 and the support arms 19–22 are also covered with a layer of electrical insulation material, such as a layer of nonconductive paint, for minimizing the possibility of current leakage paths along or through these members.

The downhole support member 13 is suspended in the borehole 11 by way of an armored multiconductor cable 41 which extends upwardly to a suitable drum and winch mechanism (not shown) located at the surface of the earth for raising and lowering the support member 13. The first 100 feet or so of the cable 41 immediately above the instrument housing portion 14 is covered with a layer of electrical insulation material 42 such as rubber. Supported on this layer of insulation material 42 towards the upper end thereof are an electrically-remote current-return electrode $B_0$ and an electrically-remote potential reference electrode N. The various individual insulated conductors in the cable 41 serve to interconnect the electrical circuits in the downhole instrument housing portion 14 with suitable power supply and recorder equipment located at the surface of the earth.

Referring now to FIG. 5 of the drawings, there is shown a cross section of a portion of the borehole 11 passing through a permeable stratum or bed 45 of material such as sand. Invasion of the drilling mud 12 into this permeable bed 45 has served to build up a mud cake 46 on the wall of the borehole in front of this strata 45. Shown suspended in the borehole 11 in the region of the permeable bed 45 are the electrode pad members 17 and 18 which are shown in a simplified cross-sectional manner. Also shown, in a schematic manner, are typical electrical circuits for operating the electrode pad members 17 and 18. The circuit portions contained within the dash line box 14 of FIG. 5 correspond to the circuit portions that are located within the interior of the instrument housing portion 14 of FIG. 1.

As shown in FIG. 5, an electrical power source 47 is located at the surface of the earth and serves to supply alternating current at a frequency of, for example, 60 cycles by way of a transformer 48, conductors 41a and 41b of the multiconductor cable and a transformer 49 to a downhole power supply unit 50. Power supply 50 serves to develop the requisite operating voltages for operating the various electrical circuits within the instrument housing portion 14. For sake of simplicity, the electrical interconnections between the power supply 50 and the various electrical circuits have been omitted.

Considering first the circuits for operating the metal pad member 17, there is included within the instrument housing portion 14 circuit means for energizing the survey current electrode $A_0$ for emitting survey current therefrom into the adjacent permeable formation 45. This circuit means includes a signal generator 51 for generating alternating current at a first frequency $f_1$ of, for example, 500 cycles. This current is then supplied by way of insulated conductor 28 to the $A_0$ electrode. The other side of the signal generator 51 output is connected by way of cable conductor 41c to the electrically-remote current-return electrode $B_0$. In this manner, the $A_0$ electrode is energized to emit survey current $I_s$ into the adjacent formation, which survey current eventually diverges and returns to the remote electrode $B_0$. For this embodiment of the invention, the signal generator 51 is constructed to supply a constant amount of survey current $I_s$ to the $A_0$ electrode. To this end, the signal generator 51 includes suitable oscillator and current regulator circuits.

The electrical circuits for the metal pad member 17 also include circuit means for providing an indication of the potential difference between the monitor electrode M and one of the survey and focussing current electrodes $A_0$ and $A_1$. In this embodiment, this indication is of the potential difference between the monitor electrode M and the survey current electrode $A_0$. This circuit means includes conductors 28 and 52 which serve to connect the $A_0$ electrode to one input terminal of a high-gain feedback amplifier 53 and conductor 29 which serves to connect the monitor electrode M to the other input terminal of amplifier 53. In this manner, there is supplied to the input of amplifier 53 an indication of the M—$A_0$ potential difference.

The electrical circuits for the metal pad member 17 further include circuit means for energizing the focussing current electrode $A_1$ and for adjusting the focussing current "$I_f$" emitted therefrom until the M—$A_0$ potential difference becomes substantially zero. This circuit means includes the feedback circuit means formed by the high-gain feedback amplifier 53 and conductors 30 and 40 which connect the output terminals of this amplifier 53 between the focussing current electrode $A_1$ and the electrically-proximate current-return electrode $B_1$. Amplifier 53 is constructed to pass signals at only the $f_1$ operating frequency. In this manner, the conductors 28, 29 and 52, the amplifier 53 and the conductors 30 and 40 form circuit means responsive to the potential difference between the monitor electrode and one of the current-emitting electrodes for emitting focussing current from the $A_1$ electrode of such magnitude and polarity as to reduce the M—$A_0$ potential difference substantially to zero.

The electrical circuits for the metal pad member 17 also include means responsive to the flow of at least one of the survey and focussing currents $I_s$ and $I_f$ for providing an indication representative of the formation resistivity or conductivity. In this embodiment, this means includes an amplifier 54, the input terminals of which are connected between the potential monitor electrode M and the electrically remote potential reference electrode N by way of conductors 29 and 41d. This amplifier 54 is also constructed to pass signals at only the $f_1$ operating frequency. The potential or voltage signal thus supplied to the input of the amplifier 54 is amplified therein and then supplied to a phase sensitive detector 55. Also supplied to the phase sensitive detector 55 by way of conductors 56 and 57 is a phase reference signal from the signal generator 51, this phase reference signal being of the same frequency and having the same phase as the survey current supplied to the $A_0$ electrode. This phase sensitive detector 55, under the control of the phase reference signal, serves to detect the inphase component of the amplified voltage signal from the amplifier 54. There is thus provided at the output of the phase sensitive detector 55 a direct current signal proportional to the potential difference between the monitor electrode M and the remote reference electrode N. This direct-current signal is then supplied by way of a conductor 58 and an insulated conductor 41e of the multiconductor cable 41 to an indicating device or meter 59 located at the surface of the earth. A phantom-type ground return circuit for the meter 59 is formed by way of conductor 60 which is center tapped to the secondary winding of transformer 48, cable conductors 41a and 41b, and conductor 61 which is center tapped to the primary winding of the downhole transformer 49. Indicating device 59 will usually take the form of one of the galvanometer units of a multiunit galvanometer type recorder, in which case it is understood that the recording medium of such multiunit recorder is advanced in synchronism with the longitudinal movement of the pad members 17 and 18 through the borehole 11.

Considering now the electrical circuits for operating the other electrode pad member, namely, the insulated pad member 18, such circuits include means for energizing the "A" electrode thereof to emit current flow "I" into the adjacent earth formation. This energizing circuit means includes a signal generator 62 for energizing the A electrode at a second frequency $f_2$ of, for example, 200 cycles. To this end, the output terminals of the signal generator 62 are connected by way of conductors 36 and 39 between the A electrode and the current-return electrode B on the backside of the insulated pad 35. The signal generator 62 includes suitable oscillator and current regulator circuits for supplying a constant current to the A electrode. Note that because of the relatively small size of the A electrode and because of the relatively extensive area of the insulated pad 35, the current-return electrode B on the backside thereof is effectively electrically remote from the current emitting electrode A.

The electrical circuits for the insulated pad member 18 also include a pair of outlet circuits responsive to the flow of the A electrode current for providing two different indications of the resistivity of the material in front of the pad member 18. The first of these circuits is an "inverse" type circuit and includes an amplifier 63, the input terminals of which are connected between the $M_1$ and $M_2$ potential monitor electrodes by way of conductors 37 and 38. Amplifier 63 is constructed to pass signals at the $f_2$ operating frequency while rejecting signals at the $f_1$ frequency. In this manner, there is supplied to the amplifier 63 an "inverse" type measure signal which is amplified therein and supplied to a phase sensitive detector 64. Also supplied to the phase sensitive detector 64 is a phase reference signal of frequency $f_2$, which signal is supplied thereto from the signal generator 62 by way of conductors 65 and 66. This phase reference signal is of the same phase as the current flow I emitted from the A electrode. Under the control of this phase reference signal, the phase sensitive detector 64 serves to provide a direct-current output signal which is proportional to the "inverse" measure signal represented by the $M_1$—$M_2$ potential difference. This direct-current signal is then supplied by way of a conductor 67 and a cable conductor 41g to an indicating device or galvanometer unit 68 located at the surface of the earth. A phantom-type ground-return circuit is again provided by the conductors 60 and 61 which are center tapped to the transformers 48 and 49 associated with the cable conductors 41a and 41b.

The second output circuit for the insulated pad member 18 is provided by an amplifier 69, also constructed to pass signals at the operating frequency $f_2$ while rejecting any $f_1$ signals, the input terminals of amplifier 69 being connected between the $M_2$ potential monitor electrode and the electrically-remote potential reference electrode N by way of conductors 38 and 41d, respectively. There is thus provided at the input of the amplifier 69 a "normal" type measure signal which is amplified therein and then supplied to a phase sensitive detector 70. Also supplied to the phase sensitive detector 70 is the phase reference signal from the signal generator 62. Phase sensitive detector 70 thus serves to detect the "normal" type measure signal and provide a direct-current representation thereof. This direct current signal is supplied by way of a conductor 71 and a cable conductor 41f to an indicating device or galvanometer unit 72 located at the surface of the earth. A phantom-type ground-return circuit is again provided by conductors 60 and 61.

Before considering in detail the operation of the apparatus thus far described, it will be helpful to consider a typical manner in which the earth formation resistivity values may vary as a function of radial or horizontal distance out from the axis of the borehole 11. Curve E of the graph of FIG. 6 represents such a resistivity variation or resistivity profile for the case of a permeable water-bearing sand formation. In FIG. 6:

$R_m$=the resistivity of the drilling mud contained in the borehole
$R_{mc}$=the resistivity of the mud cake
$R_i$=the average resistivity of the invaded zone
$R_{xo}$=the resistivity of the flushed portion of the invaded zone close to the wall of the borehole
$R_t$=the true resistivity of the uncontaminated portion of the formation.

For the case of an eight-inch diameter borehole, the drilling mud occupies the major portion of the four-inch span from the center axis of the borehole up to the wall of the borehole and will frequently have a resistivity value $R_m$ on the order of the one ohm-meter. The mud cake formed on the wall of the borehole may have a thickness of anywhere from nearly zero up to about one inch and the resistivity value $R_{mc}$ thereof may be on the order of two-ohm meters. The flushed portion of the invaded zone usually extends inwardly from the borehole wall for a distance on the order of three inches and may have a resistivity value $R_{xo}$ on the order of 10 to 20 ohm-meters or more. The overall depth of the invaded zone as a whole is subject to considerable variation from formation to formation but a value on the order of ten inches may be considered as typical. Farther out from the wall of the borehole lie the uncontaminated portions of the formation which may have a resistivity value $R_t$ on the order of one to two ohm-meters for the case of a water-bearing sand.

It is thus apparent from the graph of FIG. 6 that a substantial impedance hump or barrier may exist adjacent the wall of the borehole 11 which will tend to impede the flow of any current from the borehole into the earth formations. It is to be understood, however, that the example of FIG. 6 is representative of only one of many possible situations that may actually exist because each of the parameters mentioned above is subject to a considerable range of variation from borehole to borehole and from strata to strata in the same borehole. In particular, in the case of an oil-bearing sand, as opposed to the water-bearing sand illustrated in FIG. 6, the resistivity $R_t$ of the uncontaminated zone would be substantially greater and, in some cases, the invaded zone and the uncontaminated zone would be separated by an intermediate "low zone," commonly referred to as the "annulus." Nevertheless, the example of FIG. 6 will be helpful in understanding the present invention.

Considering now the operation of the apparatus thus far described, as the support member 13 of FIG. 1 is moved through the borehole 11 in an upward direction, the support arms 19–22 are extended to urge the electrode arrays carried by the electrode pad members 17 and 18 against the borehole wall. Referring to FIG. 5 and considering first the operation of the metal pad member 17, the $A_0$ survey current electrode thereof is, at the same time, energized by signal generator 51 to emit from the surface thereof a flow of survey current $I_s$ at a first frequency $f_1$. The signal generator 51 operates to maintain the total amount of this survey current $I_s$ at a substantially constant value. The resulting potential difference between the $A_0$ electrode and the potential monitor electrode M serves to actuate the feedback amplifier 53 to, in turn, energize the $A_1$ focussing current electrode to emit a flow of focussing current $I_f$ at the same frequency $f_1$ from the surface thereof. The magnitude and polarity of this focussing current $I_f$ is adjusted by the feedback amplifier 53 so as to oppose any tendency of the survey current $I_s$ to flow away from the $A_0$ electrode in a vertical direction until after it has passed into the adjacent earth formation a desired lateral distance. This feedback action is both automatic and degenerative in nature and continues until the M—$A_0$ potential difference becomes substantially zero, this zero potential gradient indicating an absence of vertical current flow components in the vicinity thereof.

Now, because the survey current flow $I_s$ is maintained fairly constant, the potential level in the vicinity of the monitor electrode M with respect to a remote reference point such as the N electrode will vary as a function of the formation resistivity in front of the metal pad member 17. In particular, the potential level of the monitor electrode M itself will be directly proportional to the formation resistivity. This potential level of the M electrode with respect to the N reference electrode is then monitored by the amplifier 54 and converted to a direct-current signal by the phase sensitive detector 55. This direct-current signal is transmitted by way of conductors 58 and 41e to the galvanometer unit 59 at the surface of the earth to record thereon the desired resistivity indication.

Most of the voltage drop within the formation which is caused by the flow of survey current $I_s$ occurs over the cross-hatched region $a$ where the current density is greatest. Once the survey current beam begins to diverge in an effort to return to the remote $B_0$ electrode, the current flow rapidly spreads out over such a large area that the effective resistance to this current flow becomes negligible. Consequently, the resistivity value indicated by the galvanometer unit 59 corresponds to the volume of formation material the cross section of which is indicated by the cross-hatched area $a$.

For a case like that illustrated by the graph of FIG. 6, where the resistivity of the mud cake 46 is relatively low while the resistivity of the formation 45 immediately adjacent the wall of the borehole 11 is relatively high, there is a strong tendency for some of the survey current $I_s$ to flow along the mud cake 46 and then back to the $B_0$ current-return electrode by way of the low resistivity drilling mud 12 contained in the borehole 11. This tendency becomes greater as the thickness of the mud cake 46 increases. Even for relatively thick mud cakes, however, having a thickness on the order of one inch, this tendency is largely overcome in accordance with one feature of the present invention by the fact that the focussing current $I_f$ is emitted from both the edge 24 and the backside 25 as well as from the wall-engaging face 23 of the $A_1$ electrode. In other words, the extended area of the $A_1$ focussing current electrode and, particularly, the fact that this electrode extends over and forms the edge of the electrode pad serve to maintain the potential level in the vicinity of the pad edges at a fairly high value corresponding closely to the potential level of the center $A_0$ electrode. Thus, there is, if any, only a minimum of potential gradient in the immediate vicinity of the pad member 17 to induce flow of survey current components along the mud cake 46. Also, because a large portion of the focussing current $I_f$ is already being emitted directly into the low resistivity drilling mud 12, this high potential region will be maintained fairly constant as borehole conditions vary and, in particular, as the thickness of the mud cake 46 varies. This substantially minimizes the introduction of any undesired variations into the resistivity signal which is recorded by the galvanometer unit 59.

Combined with this feature of an extended $A_1$ electrode is the further feature represented by the assymetrical type of monitoring utilized to maintain the M—$A_0$ potential difference at a value of zero. This monitoring of the potential difference between a single monitor electrode and one of the current-emitting electrodes, as opposed to the known practice of monitoring between a pair of monitor electrodes, serves to provide a desired hyperfocussing action which "pinches" the survey current beam $I_s$, that is, causes it to converge somewhat before it begins to diverge. This pinching action further minimizes the tendency of the $I_s$ beam to diverge too rapidly. In other words, the fact that the potential difference between $A_0$ and M is substantially zero, means that the M electrode is at the same potential level as the $A_0$ electrode. In order to obtain this condition, it is necessary that the $A_1$ electrode operate at a slightly higher potential level. This higher potential level provides the desired hyperfocussing action. This higher potential level is maintained automatically in the present embodiment by the feedback circuit which supplies the focussing current $I_f$ to the $A_1$ electrode.

It has been found that a stronger focussing action is obtained by using both the assymetrical type of monitoring together with the extended $A_1$ electrode than could be obtained using either of these features separately. Consequently, resistivity measurements made with the metal pad member 17 are much less effected by the presence of even relatively thick mud cakes. In fact, tests have indicated that the measurements remain fairly constant as a function of mud cake thickness for mud cakes ranging from zero to nearly one inch in thickness.

Having caused the survey current beam $I_s$ to pass the impedance hump adjacent the borehole wall without any mud cake shunting action, the problem then arises to diverge and rapidly dissipate the beam after it has penetrated a distance corresponding to the major portion of the invaded zone. In other words, the strong focussing action which renders the beam insensitive to mud cake also tends to force the beam to penetrate too deeply into the formation. For the present invention, this tendency is overcome by providing an electrically-proximate current-return electrode $B_1$ for the focussing current $I_f$. This current-return electrode $B_1$ is located on the support member 13 in the center of the borehole close enough to the location of the metal pad member 17 so that the focussing current $I_f$ is attracted back to the borehole relatively rapidly. This, in turn, allows the survey current beam $I_s$ to diverge somewhat sooner. Care must be taken, however, not to locate the $B_1$ return electrode too close to the pad member 17, otherwise the strong initial focussing action for the $I_s$ beam will be impaired. In particular, none of the $B_1$ current-return electrode should be located directly behind the metal pad member 17 but instead should be longitudinally spaced apart therefrom. In this regard, the use of the extended $A_1$ electrode is particularly important in that it reduces any tendency of the $B_1$ current-return electrode to produce a low potential region close enough to the pad member 17 to cause $I_s$ current flow through the mud cake 46.

It has been found that by following the principles of the present invention, a depth of penetration for the survey current beam $I_s$ on the order of 10 inches can be accurately provided. In most cases, this will provide a fairly accurate measure of the average resistivity $R_i$ of the invaded zone. Note that only a minimum of potential drop occurs across the mud cake 46 because of the relatively low resistivity thereof. In other words, nearly all of the measured potential drop is determined by the invaded zone resistivity. Knowing the invaded zone resistivity, this information can be used together with the apparent resistivity values recorded by deeper penetration electrode-type logging devices to provide a more accurate measure of the resistivity of the uncontaminated portion of the formation. This information can also be used together with the data obtained with a deep investigation coil-type induction logging device, which data is representative of essentially only the resistivity of the uncontaminated portion of the formation, to provide a more complete picture of borehole conditions.

The relatively large surface area of the $A_0$ survey current electrode also aids in providing a better measure of the average resistivity value of the invaded zone. This is because it enables a bigger volume of the invaded zone material to be measured which, in turn, provides a more accurate indication of the average value. It also insures that a large percentage of the survey current flow will be in a lateral direction at the moment it leaves the electrode surface.

A metal pad type of electrode pad member constructed and operated in accordance with the present invention is also useful in providing more accurate measurements of the resistivity value $R_{xo}$ of the flushed portion of the invaded zone close to the borehole wall. As is known, this resistivity value is extremely useful in calculating the porosity of permeable formations. In particular, more accurate measurements of $R_{xo}$ can frequently be obtained even where the flushed zone extends only to a lateral depth of approximately three inches while the survey current beam $I_s$ penetrates more nearly to a lateral depth of ten inches. This is because the resistivity value will not, in many cases, change too rapidly from the $R_{xo}$ value over the remainder of the three to ten inch span. Also, for the case of thick mud cakes, the reduced influence of the mud cake will yield measurements closer to the true value of $R_{xo}$ than can be obtained with other types of electrode arrays.

In order to obtain an even more accurate measurement of $R_{xo}$, the depth of penetration of the survey current beam $I_s$ could be somewhat further reduced by moving the electrically-proximate current-return electrode $B_1$ somewhat closer to the pad member 17 and by reducing somewhat the size of the $A_0$ electrode. Care must be exercised, however, not to appreciably reduce the strong initial focussing action, otherwise the insensitivity to mud cake thickness will be impaired.

It will be noted that the "all-metal" form of construction used for the metal pad member 17 also provides a more rugged form of electrode pad which will hold up better under adverse borehole conditions. Also, the relatively strong focussing action associated with this pad member 17 renders the apparatus relatively insensitive to variations in either the borehole diameter or in the degree of contact between the pad member and the borehole wall.

Considering now the operation of the other electrode pad member shown in FIG. 5, namely, the insulated pad member 18, this insulated pad member is operated in accordance with the general teachings of Doll Patent No. 2,669,688. To this end, the current "I" emitted from the A electrode thereof by the signal generator 62 serves to establish approximately hemispherical equipotential surfaces extending into the formation material in front of the pad member and concentric with the A electrode. The potential level of a hemispherical surface at any given radius depends on the resistivity of the material traversed by the current flow I. Note that the current I is emitted at a second frequency $f_2$. Consequently, this current flow will not disturb the measurements made with the metal pad member 17.

The potential difference established between the two monitor electrodes $M_1$ and $M_2$ of the insulated pad member 18 corresponds to the resistivity of the material intermediate the two hemispherical equipotential surfaces corresponding to these two electrode spacings. For the present case of a relatively thick mud cake, this potential difference will be determined primarily by the mud cake resistivity. Consequently, the corresponding inverse-type signal recorded by the galvanometer unit 68 at the surface of the earth will be indicative of the mud cake resistivity. The normal-type signal obtained by measuring the potential difference between the outer $M_2$ electrode and the remote reference electrode N, on the other hand, will be indicative of the resistivity of the formation material out to a lateral depth of approximately twice the A—$M_2$ spacing and, hence, will include a substantial part of the formation material in back of the mud cake as well as the mud cake itself. This normal-type signal will be recorded on galvanometer unit 72. Consequently, a difference in the value of the readings of galvanometer units 68 and 72 will indicate the existence of a mud cake on the borehole wall. The shunting action of the mud cake 46 on the current flow I is clearly evident.

The two different types of electrode pad members represented by the metal pad member 17 and the insulated pad member 18 serve to complement one another in a particularly advantageous manner in exploring the length of a borehole. The insulated pad member 18 serves to indicate the presence of permeable strata by indicating the presence of mud cake, while the metal pad member 17 then serves to provide an accurate measure of either or both of the invaded zone resistivity $R_i$ and the flushed zone resistivity $R_{xo}$. If desired, either part or all of the electrical circuits shown within the instrument housing portion 14 of FIG. 4 could instead be located at the surface of the earth.

Referring now to FIG. 7 of the drawings, there is shown a modified form of electrical circuits which may be used with a metal pad type of electrode pad member 80 which is generally similar to the metal pad member 17 of FIG. 5. As shown in FIG. 7, the electride pad member 80 is formed principally by the metal pad portion which constitutes the $A_1$ focussing current electrode. Located on the wall-engaging face of this $A_1$ portion and separated therefrom by electrical insulation material are a central survey current electrode $A_0$ and an encircling potential monitor electrode M.

In this FIG. 7 embodiment, the circuits are constructed to maintain the potential level $V_m$ of the monitor electrode M relatively constant with respect to a remote reference point and to determine the formation resistance characteristics by measuring the resulting variations in the magnitude of the survey current $I_s$ emitted from the central $A_0$ electrode. To this end, the electrical circuits include a source 81 of alternating-current reference voltage $V_r$ which is supplied by way of an input transformer 82a and a high-gain amplifier 82 to the $A_1$ focussing current electrode. In this manner, the focussing current electrode $A_1$ is energized to emit focussing current $I_f$ into the adjacent earth formation. Also supplied to the input transformer 82a of the amplifier 82 is a signal representative of the potential level $V_m$ of the potential monitor electrode M. This voltage or potential signal $V_m$ is supplied with like polarity to the side of the transformer 82a primary winding opposite from the reference voltage $V_r$ side so that if the monitor electrode M is at a potential level equal to the reference voltage $V_r$, then the net input signal to the amplifier 82 is substantially zero. If, on the other hand, the potential level $V_m$ of the monitor electrode M differs from this $V_r$ value, then the amplifier 82 input signal, which is in the nature of a degenerative feedback error signal, serves to adjust the amplifier output current $I_f$ which is supplied to the $A_1$ electrode so as to bring the monitor voltage $V_m$ back to the desired $V_r$ value. In this manner, the feedback action of this portion of the circuit serves to maintain the potential level of the monitor electrode M substantially constant with respect to a remote reference point represented by the ground terminal N.

As before, the potential difference between the monitor electrode M and the $A_0$ survey current electrode is adjusted so as to be maintained at a value of substantially zero. To this end, the monitor electrode signal $V_m$ is also supplied to an input transformer 83a of a high-gain amplifier 83. Also supplied to the input transformer 83a of the amplifier 83, but to the opposite side of the primary winding thereof, is a signal representative of the potential level of the $A_0$ electrode. This $A_0$ signal is supplied by way of conductors 84 and 85. Consequently, if the M—$A_0$ potential difference is not substantially zero, then the error signal existing at the input of the amplifier 83 serves to adjust the amplifier output current $I_s$ which is supplied to the $A_0$ electrode by way of conductor 84 so as to establish this desired zero potential difference.

As the resistivity of the formation material in front of the electrode pad member 80 varies, then differing amounts of survey current $I_s$ will be required in order to maintain the M—$A_0$ potential difference at a zero value. The amount of survey current required will be directly proportional to the conductivity of the formation material. The magnitude of the $I_s$ current flow therefore provides an indication of the formation conductivity. This indication is transmitted to the surface of the earth by means of a transformer 86 having a low impedance primary winding coupled in series between the amplifier 83 output and the conductor 84 leading to the $A_0$ electrode. Consequently, the voltage signal appearing across the secondary of this transformer 86 is proportional to the $I_s$ current flow and, hence, to the formation conductivity. This voltage signal is transmitted to a galvanometer unit 87 at the surface of the earth by way of cable conductors 88 and 89 to provide the desired output indication.

The focussing action provided by the metal pad member 80 is substantially the same as that discussed in connection with the metal pad member 17 of FIG. 5 and as there indicated, serves to provide an accurate measure of the resistivity of either the invaded zone or the flushed zone of a permeable strata. As before, the resulting measurements are substantially unaffected by variations in the mud cake thickness, even for the case of relatively thick mud cakes.

The electrode pad member 80 of FIG. 7 includes a further feature in that the central portion of the backside of the pad member is covered with a layer of electrical insulation material 90. This serves to reduce somewhat the current required from the $A_1$ electrode which, in turn, reduces the current drain on the amplifier 82. At the same time, it does not appreciably disturb the focussing action in that a substantial amount of $A_1$ focussing current will continue to be emitted from the edge and the outer peripheral area of the backside of the pad member 80 directly into the drilling mud contained in the borehole.

Instead of using either the constant-current circuit of FIG. 5 or the constant-voltage circuit of FIG. 7 for the metal pad member, both the voltage and current may be allowed to vary and a suitable ratio circuit or device may be used for taking the ratio of the voltage to the current, or vice versa, for providing the desired output signal. Where a ratio circuit is used, the feedback circuit means used to maintain the M—$A_0$ potential difference at a value of substantially zero may be used to adjust either the survey current flow from the $A_0$ electrode or the focussing current flow from the $A_1$ electrode. It is also noted that the metal pad type of electrode pad member may be used in combination with deep-investigation logging devices either for providing the requisite data for adjusting the deep investigation measurements to provide more accurate determinations of the resistivity or conductivity of the uncontaminated portions of the formations or for providing a more complete picture of formation conditions adjacent the borehole.

While there have been described what are at present considered to be preferred embodiments of the invention, it will be obvious to those skilled in the art that various changes and modifications may be made therein without departing from the invention and it is, therefore, intended to cover all such changes and modifications as fall within the true spirit and scope of the invention.

What is claimed is:

1. A method of investigating earth formations traversed by a borehole comprising: emitting survey current from a first electrode in a borehole; emitting focussing current from a second electrode in the borehole spaced apart a predetermined distance from the first electrode; obtaining a signal representative of the potential difference between the first electrode and a third electrode spaced at less than the predetermined distance therefrom; adjusting one of the currents until this potential difference becomes substantially zero; and obtaining an indication representative of the flow of at least one of the currents for providing a measure of the formation resistivity.

2. A method of investigating earth formations traversed by a borehole comprising: emitting survey current from a first electrode in a borehole; emitting focussing current from a second electrode in the borehole adjacent the first electrode and spaced apart a predetermined distance therefrom; obtaining a signal representative of the potential difference between the first electrode and an intermediate electrode spaced at less than the predetermined distance from the first electrode, adjusting one of the currents until this potential difference becomes susbtantially zero; and obtaining an indication representative of the flow of at least one of the currents for providing a measure of the formation resistivity.

3. A method of investigating earth formations traversed by a borehole comprising: emitting survey current from a first electrode in a borehole; emitting focussing current from a second electrode in the borehole adjacent the first electrode and spaced apart a predetermined distance therefrom; obtaining a signal representative of the potential difference between the first electrode and an intermediate third electrode spaced at less than the predetermined distance from the first electrode; adjusting one of the currents until this potential difference becomes substantially zero; and obtaining an indication representative of the flow of the survey current for providing a measure of the formation resistivity.

4. A method of investigating earth formations traversed by a borehole comprising: emitting survey current from a first electrode in a borehole; emitting focussing current from a second electrode in the borehole having first and second portions spaced apart a predetermined distance above and below the first electrode; obtaining a signal representative of the potential difference between the first electrode and an intermediate third electrode spaced at less than the predetermined distance from the first electrode; adjusting one of the currents until this potential difference becomes substantially zero; and obtaining an indication representative of the flow of at least one of the currents for providing a measure of the formation resistivity.

5. In apparatus for investigating earth formations traversed by a borehole, the combination comprising: an electrode array adapted for movement through the borehole and including survey current and focussing current electrodes and an intermediate potential monitor electrode; circuit means for energizing one of the current electrodes for emitting current therefrom into adjacent earth formations; circuit means for providing a signal representative of the potential difference between the monitor electrode and the survey current electrode; circuit means for energizing the other current electrode and for adjusting the current emitted therefrom until said potential difference becomes substantially zero; and means responsive to the flow of at least one of the currents for providing an indication representative of formation resistivity.

6. In apparatus for investigating earth formations traversed by a borehole, the combination comprising: an electrode array adapted for movement through the borehole and including survey current and focussing current electrodes and an intermediate potential monitor electrode; circuit means for energizing the survey current electrode for emitting survey current therefrom into adjacent earth formations; circuit means for providing a signal representative of the potential difference between the monitor electrode and the survey current electrode; circuit means for energizing the focussing current electrode and for adjusting the focussing current emitted therefrom until said potential difference becomes substantially zero; and circuit means coupled to one of the electrodes for providing an indication representative of formation resistivity.

7. In apparatus for investigating earth formations traversed by a borehole, the combination comprising: an electrode array adapted for movement through the borehole and including survey current and focussing current electrodes and an intermediate potential monitor electrode; circuit means for energizing the focussing current electrode for emitting focussing current therefrom into adjacent earth formations; circuit means for providing a signal representative of the potential difference between the monitor electrode and the survey current electrode; circuit means for energizing the survey current electrode and for adjusting the survey current emitted therefrom until said potential difference becomes substantially zero; and circuit means coupled to one of the electrodes for providing an indication representative of formation resistivity.

8. In apparatus for investigating earth formations traversed by a borehole, the combination comprising: an electrode array adapted for movement through the borehole and including survey current and focussing current electrodes and an intermediate potential monitor electrode; circuit means for energizing one of the current electrodes for emitting current therefrom into adjacent earth formations; circuit means responsive to the potential difference between the monitor electrode and the survey current electrode for emitting current from the unenergized current electrode of such magnitude and polarity as to reduce this potential difference substantially to zero; and means responsive to the flow of at least one of the currents for providing an indication representative of formation resistivity.

9. In apparatus for investigating earth formations traversed by a borehole, the combination comprising: an electrode array adapted for movement through the borehole and including survey current and focussing current electrodes and an intermediate potential monitor electrode; circuit means for energizing one of the current electrodes for emitting current therefrom into adjacent earth formations; feedback circuit means having input terminals coupled between the monitor electrode and the survey current electrode and responsive to the potential difference therebetween and having output terminals coupled between the unenergized current electrode and a current-return point for emitting current therebetween of such magnitude and polarity as to reduce this potential difference substantially to zero; and circuit means coupled to one of the electrodes for providing an indication representative of formation resistivity.

10. In apparatus for investigating earth formations traversed by a borehole, the combination comprising: a pad member adapted to be urged against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; the second electrode being located intermediate the first and third electrodes circuit means for energizing one of the first and third electrodes for emitting current therefrom into the adjacent earth formation; circuit means for providing a signal representative of the potential difference between the first and second electrodes; circuit means for energizing the other of the first and third electrodes and for adjusting the current emitted therefrom until said potential difference becomes substantially zero; and means responsive to the flow of at least one of the currents for providing an indication representative of formation resistivity.

11. In apparatus for investigating earth formations traversed by a borehole, the combination comprising: a pad member adapted to be urged against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current from both the wall-engaging face and the edge thereof; the second electrode being located intermediate the first and third electrodes; circuit means for energizing one of the first and third electrodes for emitting current therefrom into the adjacent earth formation; circuit means for providing a signal representative of the potential difference between the first and second electrodes; circuit means for energizing the other of the first and third electrodes and for adjusting the current emitted therefrom until said potential difference becomes substantially zero; and means responsive to the flow of at least one of the currents for providing an indication representative of formation resistivity.

12. In apparatus for investigating earth formations traversed by a borehole, the combination comprising: a pad member adapted to be urged against the borehole wall; a first electrode forming part of the pad member for emitting survey current from the wall-engaging face thereof; a second electrode forming part of the pad member for emitting focussing current from both the wall-engaging face and the edge thereof; circuit means for energizing one of the first and second electrodes for emitting current therefrom into the adjacent earth formation; means for energizing the other of the first and second electrodes and for adjusting the current emitted therefrom to maintain the potential level of the second electrode at a greater value than the potential level of the first electrode with respect to a common reference point; and means responsive to the flow of at least one of the currents for providing an indication representative of formation resistivity.

13. In apparatus for investigating earth formations traversed by a borehole, the combination comprising: a pad member adapted to be urged against the borehole wall; a first electrode forming part of the pad member and having a surface portion located on the wall-engaging face thereof for emitting survey current therefrom; a second electrode forming part of the pad member and having surface portions located on the wall-engaging face thereof defining a path encircling the first electrode surface portion for sensing a potential adjacent the wall-engaging face of the pad member; a third electrode forming part of the pad member and having surface portions located on the wall-engaging face encircling the second electrode surface portions and extending to and forming the edge of the pad member for emitting focussing current therefrom; circut means for energizing one of the first and third electrodes for emitting current therefrom into the adjacent earth formation; circuit means for providing an indication of the potential difference between the second electrode and one of the current-emitting electrodes; circuit means for energizing the other of the first and third electrodes and for adjusting the current emitted therefrom until said potential difference becomes substantially zero; and circuit means coupled to one of the electrodes for providing an indication representative of formation resistivity.

14. In apparatus for investigating earth formations traversed by a borehole, the combination comprising: a pad member adapted to be urged against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; the second electrode being located intermediate the first and third electrodes; circuit means for energizing one of the first and third electrodes for emitting current therefrom into the adjacent earth formation; circuit means for energizing the other of the first and third electrodes for emitting a second flow of current therefrom and responsive to the potential difference between the first and second electrodes for adjusting this second current flow until said potential difference becomes substantially zero; and means coupled to one of the electrodes for providing an indication representative of the formation resistivity.

15. In apparatus for investigating earth formations traversed by a borehole, the combination comprising: a pad member adapted to be urged against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; the second electrode being located intermediate the first and third electrodes; circuit means for energizing one of the first and third electrodes for emitting current therefrom into the adjacent earth formation; feedback circuit means for energizing the other of the first and third electrodes for emitting a second flow of current therefrom and having input terminals coupled between the first and second electrodes and responsive to the potential difference therebetween for adjusting this second current flow until said potential difference becomes substantially zero; and circuit means coupled to one of the electrodes for providing an indication representative of the formation resistivity.

16. In apparatus for investigating earth formations traversed by a borehole, the combination comprising: an elongated support member adapted for movement through a borehole; a pad member; means for supporting the pad member from the support member and adapted to urge the pad member against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; the second electrode being located intermediate the first and third electrodes; circuit means for energizing the first electrode for emitting survey current therefrom into the adjacent earth formation; feedback circuit means for energizing the third electrode for emitting focussing current therefrom and having input terminals coupled between the second electrode and the first electrode and responsive to the potential difference therebetween for adjusting the focussing current flow until this potential difference becomes substantially zero; and circuit means coupled to the second electrode for providing an indication proportional to the formation resistivity.

17. In apparatus for investigating earth formations traversed by a borehole, the combination comprising: a pad member adapted to be urged against the borehole wall; a first electrode forming part of the pad member and having a surface portion located on the wall-engaging face thereof for emitting survey current therefrom; a second electrode forming part of the pad member and having surface portions located on the wall-engaging face thereof defining a path encircling the first electrode surface portion for sensing a potential adjacent the wall-engaging face of the pad member; a third electrode forming part of the pad member and having surface portions located on the wall-engaging face encircling the second electrode surface portions and extending to and forming the edge of the pad member for emitting focussing current therefrom; circuit means for energizing the first electrode for emitting survey current therefrom into the adjacent earth formation; feedback circuit means for energizing the third electrode for emitting focussing current therefrom and having input terminals coupled between the second electrode and the first electrode and responsive to the potential difference therebetween for adjusting the focussing current flow until this potential difference becomes substantially zero; and circuit means coupled to the second electrode for providing an indication proportional to the formation resistivity.

18. In apparatus for investigating earth formations traversed by a borehole, the combination comprising: an elongated support member adapted for movement through a borehole; a pad member; means for supporting the pad member from the support member and adapted to urge the pad member against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; the second electrode being located intermediate the first and third electrodes; circuit means for energizing the third electrode for emitting focussing current therefrom into the adjacent earth formation; feedback circuit means for energizing the first electrode for emitting survey current therefrom and having input terminals coupled between the second electrode and the first electrode and responsive to the potential difference therebetween for adjusting the survey current flow until this potential difference becomes substantially zero; and circuit means coupled to the first electrode for providing an indication proportional to the formation conductivity.

19. In apparatus for investigating earth formations traversed by a borehole, the combination comprising: a pad member adapted to be urged against the borehole wall; a first electrode forming part of the pad member and having a surface portion located on the wall-engaging face thereof for emitting survey current therefrom; a second electrode forming part of the pad member and having surface portions located on the wall-engaging face thereof defining a path enciling the first electrode surface portion for sensing a potential adjacent the wall-engaging face of the pad member; a third electrode forming part of the pad member and having surface portions located on the wall-engaging face encircling the second electrode surface portions and extending to and forming the edge of the pad member for emitting focussing current therefrom; circuit means for energizing the third electrode for emitting focussing current therefrom into the adjacent earth formation; feedback circuit means for energizing the first electrode for emitting survey current therefrom and having input terminals coupled between the second electrode and the first electrode and responsive to the potential difference therebetween for adjusting the survey current flow until this potential difference becomes substantially zero; and circuit means coupled to the first electrode for providing an indication proportional to the formation conductivity.

20. In apparatus for investigating earth formations traversed by a borehole, the combination comprising: an elongated support member adapted for movement through a borehole; a pad member; means for supporting the pad member from the support member and adapted to urge the pad member against the borehole wall; first and second current-emitting electrodes each forming part of the pad member and at least the first electrode having a surface portion located on the wall-engaging face thereof; a current-return electrode located on the support member close enough to the location of the pad member so as to be electrically proximate thereto but longitudinally spaced apart from the location of the pad member so that no portion thereof is located directly behind the pad member; circuit means for energizing the first electrode for emitting current therefrom into the adjacent earth formation; circuit means for passing current between the second electrode and the proximate current-return electrode for controlling the flow pattern of the first electrode current; and means responsive to the flow of at least one of the currents for providing an indication representative of formation resistivity.

21. In apparatus for investigating earth formations traversed by a borehole, the combination comprising: an elongated support member adapted for movement through a borehole; a pad member; means for supporting the pad member from the support member and adapted to urge the pad member against the borehole wall; a first electrode forming part of the pad member for emitting survey current from the wall-engaging face thereof; a second electrode forming part of the pad member for sensing a potential adjacent the wall-engaging face of the pad member; a third electrode forming part of the pad member for emitting focussing current therefrom; a current-return electrode located on the support member close enough to the location of the pad member so as to be electrically proximate thereto but longitudinally spaced apart from the location of the pad member so that no portion thereof is located directly behind the pad member; circuit means for energizing the first electrode for emitting survey current therefrom into the adjacent earth formation; circuit means for passing focussing current between the third electrode and the proximate current-return electrode for controlling the flow pattern of the survey current; circuit means for providing an indication of the potential difference between the second electrode and one of the current-emitting electrodes; one of the survey current and focussing current circuit means including means for adjusting the corresponding current flow until said potential difference becomes substantially zero; and means responsive to the flow of at least one of the currents for providing an indication representative of formation resistivity.

22. In apparatus for investigating earth formations traversed by a borehole, the combination comprising: an elongated support member adapted for movement through a borehole; a pad member; means for supporting the pad member from the support member and adapted to urge the pad member against the borehole wall; a first electrode forming part of the pad member and having a surface portion located on the wall-engaging face thereof for emitting survey current therefrom; a second electrode forming part of the pad member and having surface portions located on the wall-engaging face thereof defining a path encircling the first electrode surface portion for sensing a potential adjacent the wall-engaging face of the pad member; a third electrode forming part of the pad member and having surface portions located on the wall-engaging face encircling the second electrode surface portions and extending to and forming the edge of the pad member for emitting focussing current therefrom; a current-return electrode located on the support member close enough to the location of the pad member so as to be electrically proximate thereto but longitudinally spaced apart from the location of the pad member so that no portion thereof is located directly behind the pad member; circuit means for energizing the first electrode for emitting survey current therefrom into the adjacent earth formation; circuit means for passing focussing current between the third electrode and the proximate current-return electrode for controlling the flow pattern of the survey current; circuit means for providing an indication of the potential difference between the second electrode and one of the current-emitting electrodes; one of the survey current and focussing current circuit means including means for adjusting the corresponding current flow until said potential difference becomes substantially zero; and means responsive to the flow of at least one of the currents for providing an indication representative of formation resistivity.

23. In apparatus for investigating earth formations traversed by a borehole, the combination comprising: a wall-engaging metal pad having a recess cut into a central portion of the wall-engaging face thereof; a first electrode located in the recess and electrically-insulated from the pad proper; a second electrode located in the recess encircling the first electrode and electrically-insulated from both the first electrode and the pad proper; circuit means for energizing one of the metal pad and the first electrode for emitting current therefrom into the adjacent earth formation; circuit means for energizing the other of the metal pad and the first electrode for emitting a second flow of current therefrom and responsive to the potential difference between the second electrode and one of the metal pad and the first electrode for adjusting this second current flow until this potential difference becomes substantially zero; and means responsive to the flow of at least one of the currents for providing an indication representative of the formation resistivity.

24. In apparatus for investigating earth formations traversed by a borehole, the combination comprising: a wall-engaging metal pad having a recess cut into a central portion of the wall-engaging face thereof; a first electrode located in the recess and electrically-insulated from the pad proper; a second electrode located in the recess encircling the first electrode and electrically-insulated from both the first electrode and the pad proper; circuit means for energizing the first electrode for emitting survey current therefrom into the adjacent earth formation; circuit means for energizing the metal pad proper for emitting focussing current therefrom and responsive to the potential difference between the first and second electrodes for adjusting the focussing current flow until this potential difference becomes substantially zero; and circuit means coupled to one of the electrodes for providing an indication representative of the formation resistivity.

25. In apparatus for investigating earth formations traversed by a bore hole, the combination comprising: a wall-engaging metal pad having a recess cut into a central portion of the wall-engaging face thereof; a first electrode located in the recess and electrically-insulated from the pad proper; a second electrode located in the recess encircling the first electrode and electrically-insulated from both the first electrode and the pad proper; circuit means for energizing the metal pad proper for emitting focussing current therefrom into the adjacent earth formation; circuit means for energizing the first electrode for emitting survey current therefrom and responsive to the potential difference between the first and second electrodes for adjusting the survey current flow until this potential difference becomes substantially zero; and circuit means coupled to the first electrode for providing an indication representative of the formation resistivity.

26. In apparatus for investigating earth formations traversed by a borehole, the combination comprising: an elongated support member adapted for movement through a borehole; a wall-engaging metal pad having a recess cut into a central portion of the wall-engaging face thereof; electrically-insulated means for supporting the metal pad from the support member and adapted to urge the wall-engaging face of the metal pad against the borehole wall; a first electrode located in the recess and electrically-insulated from the pad proper; a second electrode located in the recess encircling the first electrode and electrically-insulated from both the first electrode and the pad proper; a current-return electrode located on the support member close enough to the location of the pad member so as to be electrically proximate thereto but longitudinally spaced apart from the location of the pad member so that no portion thereof is located directly behind the pad member; circuit means for energizing the first electrode for emitting survey current therefrom into the adjacent earth formation; circuit means coupled between the metal pad proper and the proximate current-return electrode for passing focussing current therebetween for controlling the flow pattern of the survey current; one of the survey current and focussing current circuit means including means responsive to the potential difference between the first and second electrodes for adjusting the corresponding current flow until this potential difference becomes substantially zero; and circuit means coupled to one of the electrodes for providing an indication representative of the formation resistivity.

27. Electrode apparatus for investigating earth formations traversed by a borehole comprising: a pad member adapted to be urged against the borehole wall and including only three electrodes, to wit, a first electrode forming part of the pad member and having a surface portion located on the wall-engaging face thereof; a second electrode forming part of the pad member electrically insulated from the first electrode and having surface portions located on the wall-engaging face thereof defining a path encircling the first electrode surface portion; and a third electrode forming part of the pad member electrically insulated from the first and second electrode and having surface portions located on the well-engaging face and the edge thereof defining a region encircling the second electrode surface portions.

28. Electrode apparatus for investigating earth formations traversed by a borehole comprising: a pad member adapted to be urged against the borehole wall and including only three electrodes, to wit, a first electrode forming part of the pad member and having an elongated rectangular surface portion centrally located on the wall-engaging face thereof; a second electrode forming part of the pad member electrically insulated from the first electrode said having surface portions located on the wall-engaging face thereof defining a path encircling the first electrode surface portion; and a third electrode forming part of the pad member electrically insulated from the first and second electrodes and having surface portions located on the wall-engaging face and the edge thereof defining a region encircling the second electrode surface portions.

29. Electrode apparatus for investigating earth formations traversed by a bore hole comprising: a pad member adapted to be urged against the borehole wall and including only three electrodes, to wit, a first electrode forming part of the pad member and having an elongated rectangular surface portion centrally located on the wall-engaging face thereof; a second electrode forming part of the pad member electrically insulated from the first electrode and having surface portions located on the wall-engaging face thereof defining a path encircling the first electrode surface portion; and a third electrode forming part of the pad member electrically insulated from the first and second electrodes and having surface portions located on the wall-engaging face and the edge thereof defining a region encircling the second electrode surface portions; the first electrode surface portion having a width greater than one-quarter its length and a length greater than one-half the overall length of the third electrode.

30. Electrode apparatus for investigating earth formations traversed by a borehole comprising: a pad member adapted to be urged against the borehole wall and including only three electrodes, to wit, a first electrode forming part of the pad member and having a surface portion located on the wall-engaging face thereof; a second electrode forming part of the pad member electrically insulated from the first electrode and having a surface portion of narrow width located on the wall-engaging face thereof encircling the first electrode surface portion; and a third electrode forming part of the pad member electrically insulated from the first and second electrodes and having surface portions located on the wall-engaging face and the edge thereof defining a region encircling the second electrode surface portions.

31. Electrode apparatus for investigating earth formations traversed by a borehole comprising: a pad member adapted to be urged against the borehole wall and including only three electrodes, to wit, a first electrode forming part of the pad member and having a surface portion located on the wall-engaging face thereof; a second electrode forming part of the pad member electrically insulated from the first electrode and having surface portions located on the wall-engaging face thereof defining a path encircling the first electrode surface portion; and a third electrode forming part of the pad member electrically insulated from the first and second electrodes and having surface portions located on the wall-engaging face encircling the second electrode surface portions and extending to and forming the edge of the pad member.

32. Electrode apparatus for investigating earth formations traversed by a borehole comprising: a pad member adapted to be urged against the borehole wall and including only three electrodes, to wit, a first electrode forming part of the pad member and having an elongated rectangular surface portion centrally located on the wall-engaging face thereof; a second electrode forming part of the pad member electrically insulated from the first electrode and having a surface portion of narrow width located on the wall-engaging face thereof encircling the first electrode surface portion; and a third electrode forming part of the pad member electrically insulated from the first and second electrodes and having surface portions located on the wall-engaging face encircling the second electrode surface portion and extending to and forming the edge of the pad member; the first electrode surface portion having a width greater than one-quarter its length and a length greater than one-half the overall length of the third electrode.

33. Wall-engaging electrode apparatus including only three electrodes for investigating earth formations traversed by a borehole comprising: a wall-engaging metal pad having a recess cut into a central portion of the wall-engaging face thereof; a first electrode located in the recess and electrically-insulated from the pad proper; and a second electrode located in the recess encircling the first electrode and electrically insulated from both the first electrode and the pad proper; the pad proper constituting the third of the three electrodes.

34. Wall-engaging electrode apparatus including only three electrodes for investigating earth formations traversed by a borehole comprising: a wall-engaging metal pad having a rectangular recess cut into a central portion of the wall-engaging face thereof; a first electrode of rectangular shape located in the recess and electrically insulated from the pad proper; and a second electrode of narrow width located in the recess encircling the first electrode and electrically insulated from both the first electrode and the pad proper; the pad proper constituting the third of the three electrodes.

35. Wall-engaging electrode apparatus including only three electrodes for investigating earth formations traversed by a borehole comprising: an elongated wall-engaging metal pad having an elongated rectangular recess cut into a central portion of the wall-engaging face thereof, this recess being elongated in the same direction as the metal pad; a first electrode of rectangular shape located in the recess and electrically insulated from the pad proper, this electrode having a length greater than one-half the overall length of the metal pad and a width greater than one-quarter of the electrode length; and a second electrode located in the recess encircling the first electrode and electrically insulated from both the first electrode and the pad proper; the pad proper constituting the third of the three electrodes.

36. Wall-engaging electrode apparatus including only three electrodes for investigating earth formations traversed by a borehole comprising: a wall-engaging metal pad having a recess cut into a central portion of the wall-engaging face thereof; a layer of electrical insulation material covering the surface of the recess; a first electrode located in the recess and separated from the pad proper by the insulation material; and a second electrode located in the recess encircling the first electrode and separated from both the first electrode and the pad proper by the insulation material; the pad proper constituting the third of the three electrodes.

37. Wall-engaging electrode apparatus including only three electrodes for investigating earth formations traversed by a borehole comprising: an elongated wall-engaging metal pad having an elongated rectangular recess cut into a central portion of the wall-engaging face thereof, this recess being elongated in the same direction as the metal pad; a layer of electrical insulation material covering the surface of the recess; a first electrode of rectangular shape located in the recess and separated from the pad proper by the insulation material, this electrode having a length greater than one-half the overall length of the metal pad and a width greater than one-quarter the electrode length; and a second electrode of narrow width located in the recess encircling the first electrode and separated from both the first electrode and the pad proper by the insulation material; the pad proper constituting the third of the three electrodes.

38. Wall-engaging electrode apparatus for investigating earth formations traversed by a borehole comprising: a wall-engaging metal pad having a recess cut into a central portion of the wall-engaging face thereof; a first electrode located in the recess and electrically-insulated from the pad proper; a second electrode located in the recess encircling the first electrode and electrically-insulated from both the first electrode and the pad proper; and a layer of electrical insulation material covering the central portion of the backside of the metal pad so as to leave exposed only the outer peripheral area of the backside.

39. A method of investigating earth formations traversed by a borehole containing a drilling fluid comprising: determining the presence of a mud cake on the wall of the borehole; emitting survey current from a first electrode in the borehole adjacent the mud cake; emitting focussing current from a second electrode in the borehole adjacent the mud cake and located a predetermined distance from the first electrode; obtaining a signal representative of the potential difference between the first electrode and a third electrode spaced at less than the predetermined distance therefrom; adjusting one of the currents until this potential difference becomes substantially zero; and obtaining an indication representative of the flow of at least one of the currents for providing a measure of the resistivity of the formation material beyond the mud cake.

References Cited in the file of this patent

UNITED STATES PATENTS

| | | |
|---|---|---|
| 2,172,778 | Taylor | Sept. 12, 1939 |
| 2,712,630 | Doll | July 5, 1955 |
| 2,750,557 | Bricaud | June 12, 1956 |
| 2,803,796 | Schuster | Aug. 20, 1957 |
| 2,806,201 | Schuster | Sept. 10, 1957 |
| 2,813,248 | Ferre | Nov. 12, 1957 |
| 2,839,721 | De Witte | June 17, 1958 |
| 2,872,638 | Jones | Feb. 3, 1959 |
| 2,876,413 | Saurenman et al. | Mar. 3, 1959 |
| 2,884,590 | Welz | Apr. 28, 1959 |
| 2,933,674 | Schuster | Apr. 19, 1960 |
| 2,967,272 | Janssen | Jan. 3, 1961 |
| 3,014,174 | Charrin et al. | Dec. 19, 1961 |